(12) United States Patent
Bhatia et al.

(10) Patent No.: US 9,804,835 B2
(45) Date of Patent: Oct. 31, 2017

(54) DYNAMIC PACING FOR SERVICE UPGRADES

(71) Applicant: Microsoft Corporation, Redmond, WA (US)

(72) Inventors: Tarun Bhatia, Snohomish, WA (US); Zohar Raz, Redmond, WA (US); Ankur Jauhari, Bothell, WA (US); Mustafaraj Dhrolia, Seattle, WA (US); Patrick Simek, Redmond, WA (US); Randy D. Thomson, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/302,334

(22) Filed: Jun. 11, 2014

(65) Prior Publication Data

US 2015/0363190 A1    Dec. 17, 2015

(51) Int. Cl.
| | |
|---|---|
| *G06F 9/44* | (2006.01) |
| *G06F 15/177* | (2006.01) |
| *G06F 9/445* | (2006.01) |
| *G06F 3/0482* | (2013.01) |
| *G06F 3/0484* | (2013.01) |
| *H04L 29/08* | (2006.01) |

(52) U.S. Cl.
CPC ............. *G06F 8/68* (2013.01); *G06F 3/0482* (2013.01); *G06F 3/04842* (2013.01); *G06F 3/04847* (2013.01); *G06F 8/65* (2013.01); *H04L 67/10* (2013.01)

(58) Field of Classification Search
CPC ....................................................... G06F 8/68

USPC ......................................................... 717/172
See application file for complete search history.

(56) References Cited

U.S. PATENT DOCUMENTS

| | | |
|---|---|---|
| 6,353,926 B1 | 3/2002 | Parthesarathy et al. |
| 7,016,944 B1 | 3/2006 | Meyer et al. |
| 7,584,467 B2 | 9/2009 | Wickham et al. |
| 7,721,332 B2 | 5/2010 | Stamper et al. |
| 7,818,740 B2 | 10/2010 | Bankston et al. |

(Continued)

FOREIGN PATENT DOCUMENTS

WO    2013/067065 A1    5/2013

OTHER PUBLICATIONS

"International Search Report and Written Opinion Issued for PCT Patent Application No. PCT/US2015/035003", Mailed Date: Aug. 7, 2015, 12 pages.

(Continued)

*Primary Examiner* — James D Rutten

(57) ABSTRACT

Disclosed herein are systems, methods, and software to enhance the upgrade process with respect to software service deployments. In at least one implementation, a user interface to an administrative portal for administering an initial deployment of a software service is presented and a notification that an upgrade is available is surfaced therein. In response to a selection of the notification in the user interface, upgrade controls are surfaced in the user interface for controlling a pace of the upgrade with respect to service components of the initial deployment. The upgrade is then applied incrementally to the service components based least in part on the pace of the upgrade specified via the upgrade controls.

13 Claims, 8 Drawing Sheets

(56) References Cited

U.S. PATENT DOCUMENTS

| | | | |
|---|---|---|---|
| 7,870,535 B2* | 1/2011 | Rippert, Jr. | G06F 8/20 717/100 |
| 8,296,267 B2 | 10/2012 | Cahill et al. | |
| 8,321,858 B1* | 11/2012 | Marmaros | G06F 8/65 717/173 |
| 2002/0100036 A1* | 7/2002 | Moshir | G06F 8/62 717/173 |
| 2006/0206587 A1 | 9/2006 | Fabbrocino | |
| 2008/0127159 A1* | 5/2008 | Regenmorter | G06F 8/65 717/168 |
| 2009/0113072 A1* | 4/2009 | Little | H04L 67/327 709/244 |
| 2012/0072716 A1* | 3/2012 | Hu | G06F 21/602 713/156 |
| 2012/0102480 A1* | 4/2012 | Hopmann | G06F 8/67 717/172 |
| 2013/0042230 A1 | 2/2013 | Little et al. | |
| 2013/0117738 A1 | 5/2013 | Livingston et al. | |
| 2013/0125107 A1* | 5/2013 | Bandakka | G06F 8/665 717/171 |

OTHER PUBLICATIONS

"Upgrade a site collection to SharePoint Online 2013", Retrieved on: Feb. 26, 2014, Available at: http://office.microsoft.com/en-in/office365-sharepoint-online-enterprise-help/upgrade-a-site-collection-to-sharepoint-online-2013-HA102865473.aspx#__Create_an__evaluation.

Reimer, Luke, "Blackberry Playbook OS 2.1", Published on: Oct. 5, 2012, Available at: http://bizblog.blackberry.com/2012/10/playbook-os-software-update/.

"Change how Windows Installs or Notifies you About Updates", Retrieved on: Feb. 26, 2014, Available at: http://windows.microsoft.com/en-in/windows/change-windows-update-installation-notification#1TC=windows-7.

"IT Administration | Configure Auto-Update Notification | Flash Player", Published on: Mar. 23, 2012, Available at: http://helpx.adobe.com/flash-player/kb/administration-configure-auto-update-notification.html.

Lefebvre, Rob, "Get Rid of Those Pesky Software Update Notifications [OS X Tips]", Published on: Nov. 30, Available at: http://www.cultofmac.com/203546/get-rid-of-those-pesky-software-update-notifications-os-x-tips/.

"Understanding Visual Upgrade in SharePoint 2010", Published on: Nov. 2010, http://msdn.microsoft.com/en-us/library/gg454789(v=office.14).aspx.

"Upgrade content databases to SharePoint 2013", Published on: Jul. 16, 2012, http://technet.microsoft.com/en-us/library/cc263299.aspx.

Jester, Benoit, "SharePoint 2013: Upgrade a Site Collection (User Interface and PowerShell)", Published on: Oct. 30, 2013, Available at: http://social.technet.microsoft.com/wiki/contents/articles/20682.sharepoint-2013-upgrade-a-site-collection-user-interface-and-powershell.aspx.

"Office 365 Community Blog", Retrieved on: Feb. 25, 2014, Available at: http://community.office365.com/en-us/blogs/office_365_community_blog/archive/2013/05/03/upgrading-to-the-new-sharepoint-online.aspx.

* cited by examiner

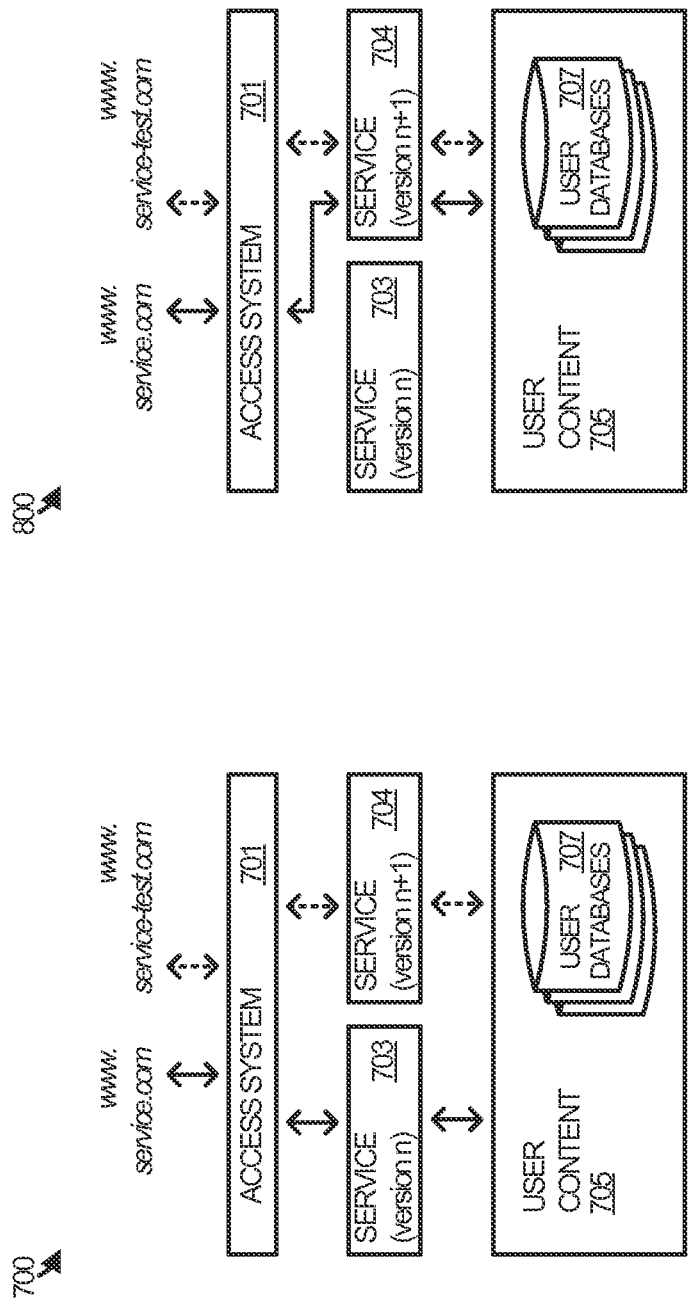

DYNAMIC PACING FOR SERVICE UPGRADES

TECHNICAL FIELD

Aspects of the disclosure are related to computing hardware and software technology, and in particular, to dynamically pacing service upgrades.

TECHNICAL BACKGROUND

Software applications and solutions are increasingly delivered as a service from data centers and other remote computing environments that are colloquially referred to as the cloud. Deploying software in the cloud allows organizations to easily scale up or down to accommodate demand. Software solutions are sometimes delivered via public clouds hosted by a software vendor, but may also be delivered via private clouds or in some hybrid manner.

Upgrading such software solutions can be a challenging endeavor, especially when the scale of many deployments is considered. A great deal of down-time and lost productivity can occur when software deployments are shut down temporarily to accommodate an upgrade. In addition, customizations that a tenant may have made to its deployment of a given software solution can be lost or rendered ineffective by an upgrade.

Many software providers that operate at scale do not give their customers control over when a given software solution is upgraded. For example, some cloud-based email solutions are routinely upgraded from one version to the next automatically, without allowing customers to control how or when the upgrades are applied.

Various upgrade techniques have attempted to mitigate these challenges. In one example, when a service deployment is scheduled to be upgraded, a tenant can be notified ahead of time and can prepare a test accordingly. A test environment can be created to which the upgraded version of the software can be deployed. Tenant data may be ported into the test environment and access provided to a select group of personnel so that the new features and functionality of the software can be tested against various tenant scenarios and customizations. Once approval is given for the new software, the test environment is torn down and a completely new build is launched with the tenant's data incorporated into it.

In a brief example, a tenant deployment of a collaboration software service may be instantiated across a physical or virtual server farm. When an upgrade is available, the tenant may launch another server farm (typically virtual) to which the upgraded version of the collaboration service is deployed. Once the upgrade is tested and approved by the tenant, the server farm is torn down, a new server farm is created, and the collaboration service is deployed to the new server farm.

OVERVIEW

Provided herein are systems, methods, and software to enhance the upgrade process with respect to software service deployments. Various implementations described herein enable tenants to control the pace at which their upgrades proceed.

In at least one implementation, a user interface to an administrative portal for administering an initial deployment of a software service is presented and a notification that an upgrade is available is surfaced therein. In response to a selection of the notification in the user interface, upgrade controls are surfaced in the user interface for controlling a pace of the upgrade with respect to service components of the initial deployment. The upgrade is then applied incrementally to the service components based least in part on the pace of the upgrade specified via the upgrade controls.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 7 illustrates an initial stage of an upgrade in an implementation.

FIG. 8 illustrates a final stage of an upgrade in an implementation.

TECHNICAL DISCLOSURE

Figure 1:
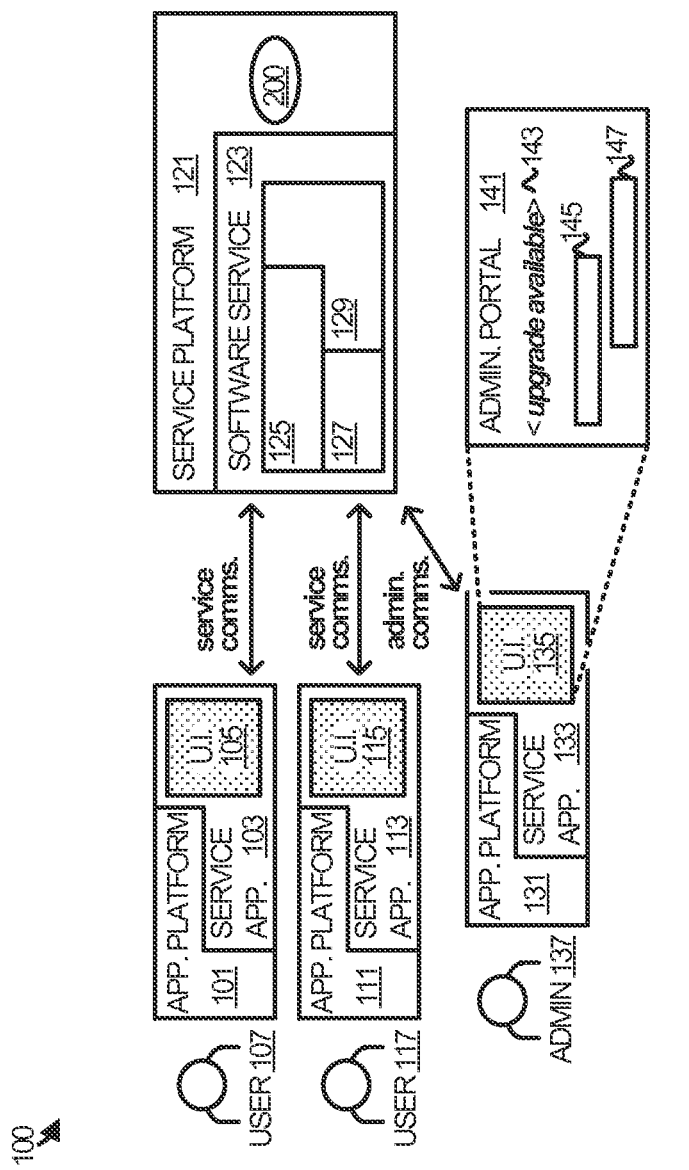
FIG. 1 illustrates a service architecture in an implementation.

Implementations disclosed herein enable the self-pacing of upgrades to software service deployments. In various implementations described herein, admin personnel may interact with an administrative portal to control when to proceed with an upgrade to a tenant deployment of a software service.

In addition to controlling the pace of upgrades, tenants may advance an upgrade incrementally, on a per-component basis. Rather than having to roll out a complete build of an upgraded deployment all at once, a tenant may specify at the service component level which portions of a tenant deployment to upgrade, and when.

Access to upgraded deployments may be provided by way of flexible service identifiers that allow tenant personnel to navigate between deployments while an upgrade is in-progress. Upgrades can be advanced or rolled-back with ease, depending upon a tenant's level of satisfaction. Once an upgrade is completed and approved, test data or other data ported over during the evaluation phase may be retained in an upgraded deployment.

In at least one implementation, a method for dynamically pacing upgrades to software service deployments includes, in a user interface to an administrative portal for administering an initial deployment of a software service, surfacing a notification that an upgrade is available for the initial deployment. In response to a selection of the notification in the user interface, upgrade controls are presented in the user interface for controlling a pace of the upgrade with respect to service components of the initial deployment. The upgrade may be applied incrementally to the service components based least in part on pace of the upgrade specified via the upgrade controls.

In some implementations, an upgraded deployment of the software service may be launched, in which each of the service components may be loaded when specified by the pace of the upgrade. The upgrade may be also be applied to each service component as appropriate.

Access to an initial deployment of a software service may be provided by way of a service identifier that resolves to the initial deployment. In this manner, service applications running remote from the initial deployment may communicate with the initial deployment using the service identifier. Upon moving forward with an upgrade, an interim service identifier may be established that differs from the service identifier and that resolves to the upgraded deployment such that at least a portion of the service applications may communicate with the upgraded deployment using the interim service identifier.

Upon completing an upgrade, the service identifier may be changed to resolve to the upgraded deployment rather than the initial deployment such that the service applications may communicate with the upgraded deployment using the service identifier. An example of the service identifier is a uniform resource locator (URL) that initially resolves to an Internet protocol (IP) address associated with the initial deployment. An example of the interim service identifier is a second URL that resolves to a second IP address associated with the upgraded deployment. Whereas the first URL may resolve to a first IP address that routes to the initial deployment before the upgrade, after the upgrade is complete the first URL will resolve to a second, different IP address that routes to the upgraded deployment of the software service.

In some implementations, the software service comprises a multi-tenant environment having multiple tenants associated with multiple deployments of the software service. In an example, the initial deployment and the upgraded deployment may be associated with a specific tenant of the multiple tenants, in which case the URL may include a name of the software service and a name of the tenant. The second URL may also include the name of the software service and the name of the tenant, but in addition may also include a string expressive of an interim status of the interim service identifier. For example, if the URL is "contoso.service.com," the second URL may be "contoso-test.service.com." Other identifiers are possible and may be considered within the scope of the present disclosure.

Examples of the software service include productivity application services (e.g. word processing, spreadsheet, and presentation application services), email services, unified communication services, relationship management services, database services, and an online collaboration service, as well as any other type of software service. In the case of collaboration services, examples of the service components include collaboration applications or modules, collaboration sites hosted by the initial deployment of the software service and, after applying the upgrade, by the upgraded deployment of the software service. Other examples include site collections, documents stores, custom code, applets, and widgets.

Turning now to FIG. 1, service architecture 100 includes application platform 101, application platform 111, and application platform 131. Service application 103 runs on application platform 101 and allows user 107 to access software service 123 via user interface 105. Service application 113 is implemented on application platform 111 and provides user 117 with a user interface 115 to software service 123. Application platform 131 runs service application 133, which also provides a user interface 135 to software service 123.

Administrative personnel, represented by admin 137, are able to access an administrative portal 141 via user interface 135. Software service 123 is implemented on service platform 121 and includes service component 125, service component 127, and service component 129.

In operation, users 107 and 117 engage with software service 123 by way of user interface 105 and 115, which are rendered on application platforms 101 and 111 by service applications 103 and 113 respectively. Admin 137 may interact with software service 123 via user interface 135 to configure software service 123 on behalf of a tenant. Admin 137 may, for example, add or remove users, configure service settings, or otherwise manage the deployment of software service 123.

Upgrades may become available from time to time. When an upgrade is available for software service 123, software service 123 (or some other application) may communicate a notification to service application 133 that is surface in user interface 135, and in particular in administrative portal 141. The notification 143 surfaced in administrative portal 141 may include a control selectable to surface update controls, represented by update control 145 and update control 147. The update controls may be used by admin 137 to configure a process for upgrading software service 123.

Figure 2:
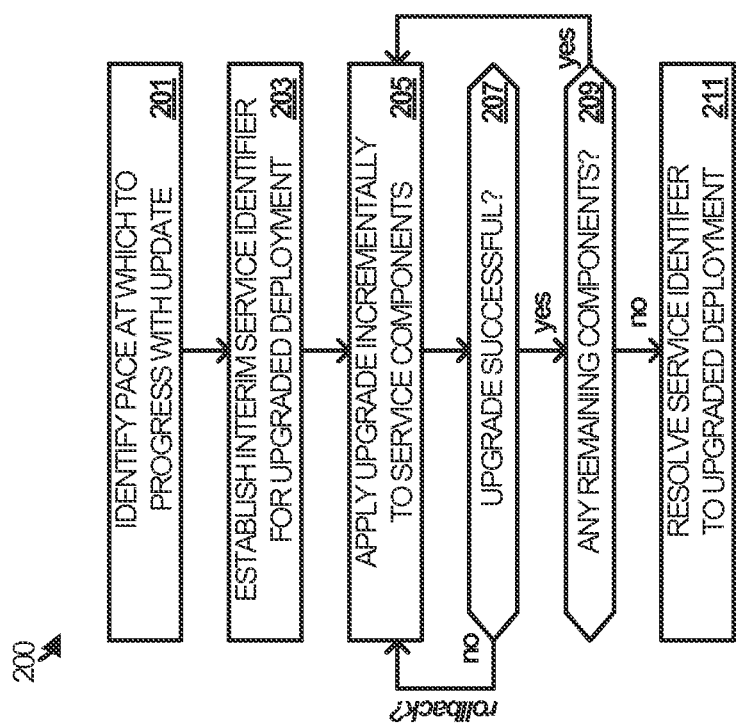
FIG. 2 illustrates an upgrade process in an implementation.
Figure 9:
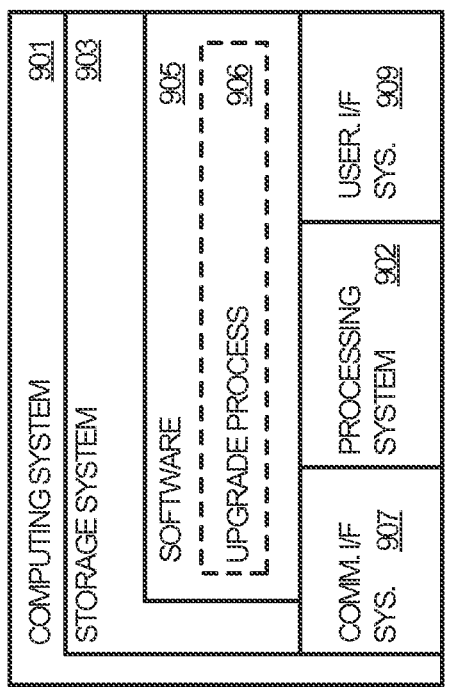
FIG. 9 illustrates a computing system suitable for implementing any of the applications, services, processes, architectures, stages, and operational scenarios disclosed herein with respect to FIGS. 1-9 and discussed below in the Technical Disclosure.

FIG. 2 illustrates an upgrade process 200 that is representative of a process that may run on service platform 121 or elsewhere in order to facilitate the upgrade of software service 123 from one version to the next. The functionality provided by upgrade process 200 may be embodied in program instructions as an upgrade service, application, or module. The program instructions may be implemented as a stand-alone service, application, or module, or may be implemented in a distributed manner across multiple services, applications, or modules, or any combination or variation thereof. Upgrade process 200, as embodied in program instructions as a service, application, or module, may be implemented on a suitable computing device or collection of devices, of which computing system 900, illustrated in FIG. 9, is representative.

The steps illustrated in FIG. 2 are noted parenthetically below, although it may be appreciated that other steps could be included in upgrade process 200. To begin, upgrade process 200 identifies a pace at which to proceed with the upgrade to software service 123 (step 201). The pace may be defined by admin 137 via upgrade controls 145 and 147 in administrative portal 141. Admin 137 may specify various aspects of the upgrade, such as which components to proceed with first, when to proceed with each component, and the like.

Once the pace of the upgrade has been specified, upgrade process 200 establishes an interim service identifier for an upgraded deployment that may have been launched in support of the upgrade (step 203). The interim identifier may differ relative to a service identifier used by service applications 103 and 113 to access software service 123.

After the upgraded deployment is launched and the interim identifier is established, the upgrade is applied incrementally with respect to each service component per the pace of the upgrade specified by admin 137 (step 205). As each service component is loaded in the upgraded deployment and evaluated, a determination is made whether or not the upgrade to the service component was successful (step 207). Such a determination may be made subjectively by admin 137 and communicated to upgrade process 200 by way of user input. However, such a determination may also be made automatically by upgrade process 200 or some other process capable of evaluating the merits of the upgrade.

At this point, if the upgrade to a particular service component was deemed not successful, then upgrade process 200 may pause to offer the tenant the chance to roll back the upgrade or pause the upgrade until a code fix is made available that can be applied to the service component. If a roll back occurs, then upgrade process 200 may continue with respect to the same service component. However, it is also possible that upgrade process 200 is directed to proceed with another service component.

If the upgrade to a given service component is deemed successfully, then upgrade process 200 proceeds to another service component. This cycle may repeat until the upgrade is disbanded or until there are no more service component to be upgraded, a determination of which may be made by upgrade process 200 automatically or with user input (step 209). Ultimately, all of the service components in an initial deployment of a software service, or all of the service components to which an upgrade may apply, are upgraded. The service identifier, which initially resolved to the initial deployment, can be changed to resolve to the upgraded deployment of the software service (step 211).

Figure 3:
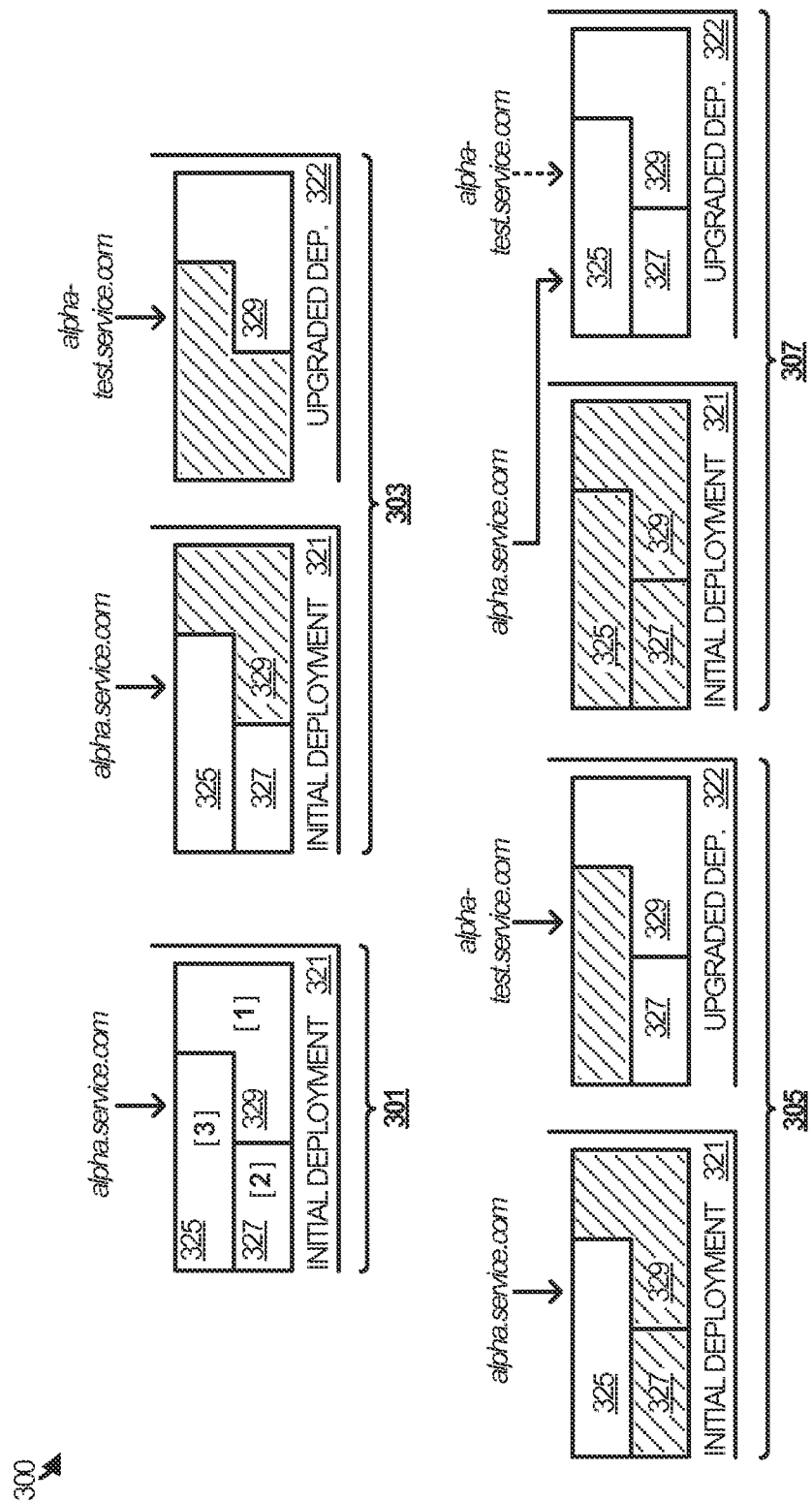
FIG. 3 illustrates an operational scenario in an implementation.

FIG. 3 illustrates an operational scenario 300 in an implementation to facilitate the various concepts and principals proposed herein. Operational scenario 300 involve an initial deployment 321 of a software service. Initial deployment 321 includes service component 325, service component 327, and service component 329. During an initial stage 301, a pace of an upgrade to the initial deployment 321 has been defined by administrative personnel. The pace in this scenario specifies that the upgrade proceed first with service component 329, followed by service component 327, and then service component 325. Such pacing allows the tenant associated with initial deployment 321 to evaluate the merits of the upgrade on a per-component basis before moving forward with the rest of the upgrade. Note that a service identifier alpha.service.com is associated with initial deployment 321 and is used to route traffic to initial deployment 321.

Once the pace of the upgrade has been specified, the upgrade commences during the next stage 303. At this stage, the service identifier remains resolved to initial deployment 321. An upgraded deployment 322 of the software service has been launched and service component 329 loaded therein. Service component 329 may also remain operational initial deployment 321, although it could optionally be disabled. An interim service identifier, alpha-test.service.com, has been created and resolves to upgraded deployment 322. In this manner, tenant personnel may access the upgraded version of service component 329 in order to test its features and functionality.

Assuming the upgrade of service component 329 is approved, the upgrade proceeds to a stage 305 during which service component 327 is loaded into upgraded deployment 322 and itself upgraded (to the extent it can be upgraded). As with service component 329, service component 327 is loaded into upgraded deployment 322. Service component 327 may remain operational in initial deployment 321 or could be disabled.

At stage 307, service component 325 is loaded into and upgraded within the context of upgraded deployment 322. Service component 325 may remain operational in initial deployment 321. However, once the upgrade to service component 325 is deemed successful, then the entirety of the initial deployment 321 of the software service will have been upgraded. Accordingly, the service identifier can be changed to resolve to upgraded deployment 322. In this manner, traffic that had previously been directed to initial deployment 321 will be directed to upgraded deployment 322 moving forward. The interim service identifier may be disabled, but may optionally remain in service.

Figure 4:
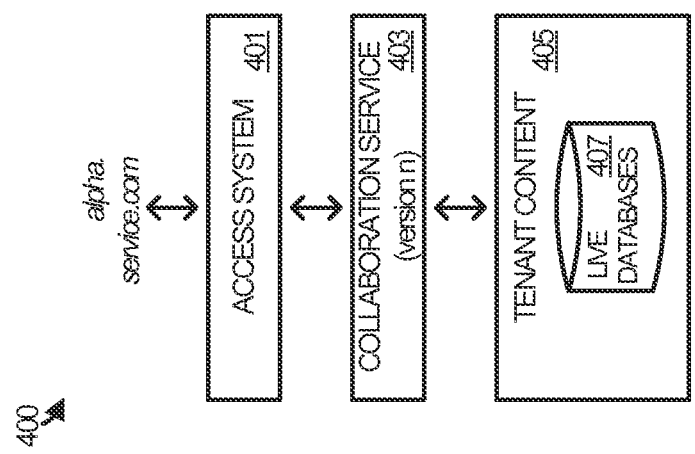
FIG. 4 illustrates an initial stage of an upgrade in an implementation.
Figure 5:
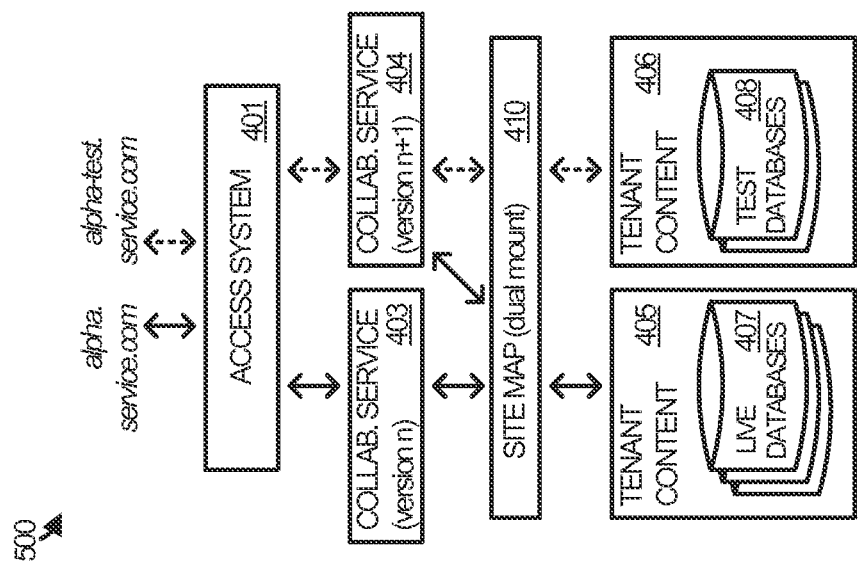
FIG. 5 illustrates an intermediate stage of an upgrade in an implementation.
Figure 6:
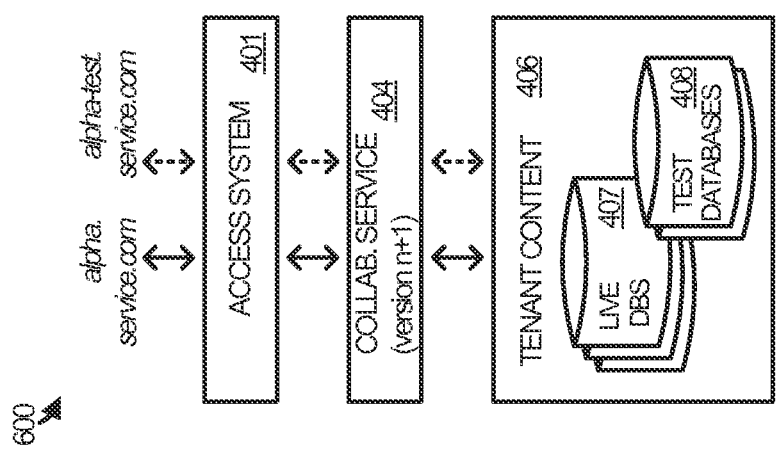
FIG. 6 illustrates a final stage of an upgrade in an implementation.

FIGS. 4-6 illustrate various stages in an upgrade process as applied with respect to a collaboration service. Referring to FIG. 4, during an initial stage 400 of the upgrade process, an access system 401 provides access to collaborations service 403. A service identifier alpha.service.com is used by service applications to make requests of collaboration service 403 that are routed through access system 401. An example of access system 401 is a load balancer from F5.

Collaboration service 403 during the initial stage 400 is deployed in accordance with version n. Collaboration service 403 interfaces with tenant content 405, which may include live database 407. In other words, users interacting with service applications (on application platforms) engaged with data and other content stored in live database 407 by way of collaboration service 403. The users may collaborate on the data, such as by jointly editing or sharing documents, viewing collaboration sites, and the like. Google® Docs from Google®, SharePoint® from Microsoft®, and SharePoint® Online from Microsoft® are examples of collaboration services.

The upgrade process may proceed to an intermediate stage 500 illustrated in FIG. 5. At this stage, the pace of the upgrade has been defined by administrative personnel and the upgrade is proceeding accordingly. An interim identifier has been created (alpha-test.service.com) an upgraded version of collaboration service 403 has been instantiated, as represented by collaboration service 404 (version n+1). In addition, tenant content 406 has been instantiated, which includes test databases 408 for personnel to interact with.

Site map 410 has also been established in this scenario. Site map 410 allows tenant content 405 to be dual mounted such that at last some of it is accessible via collaboration service 404, in addition to collaboration service 403. In some implementations, site map 410 is used to associate or redefine tenant content 405 such that, over time, it becomes tenant content 406. Rather than actually copying and moving the data included in tenant content 405, site map 410 can be changed to link live databases 407 to collaboration service 404 during the course of the upgrade process. Thus, while test databases 408 are referred to as "test" data, it may be appreciated that the data could actually be an instance of live data and may be considered live data once the upgrade is complete. This allows for a continuity of service during the upgrade process. Personnel that interact with text databases 408 using the interim service identifier can continue to interact with the same data, in the same state, once the upgrade process is complete. Utilizing site map 410 also allows any stage in the upgrade to be rolled back without losing data or other customizations.

In general, requests and other interactions that are communicated using the service identifier alpha.service.com are routed by access system 401 to collaboration service 403. Accordingly, the requests and interaction are applied to tenant content 405 and live databases 407. At the same time, requests and other interactions that are communicated using the interim service identifier alpha-test.service.com are routed by access system 401 to collaboration service 404, which is an upgraded version of collaboration service 403. The requests and interaction will generally be processed using tenant content 406 and test databases 408, although tenant content 405 and live databases 407 can be accessed by collaboration service 404.

Eventually the upgrade process is completed and the upgrade to collaboration service 403 is approved. At this final stage 600, illustrated in FIG. 6, access system 401 may be reached by either service identifier, although the interim service identifier may be decommissioned. Rather, the main service identifier—alpha.service.com—is resolved to collaboration service 404, instead of collaboration service 403. In fact, collaboration service 403 may be torn down at this point. Live databases 407 are effectively migrated into tenant content 406, which is accessible via collaboration service 404. Tenant content 406 therefore includes live database 407 and test databases 408, which as mentioned may be considered live data, especially after the completion of the upgrade process.

FIGS. 7-8 illustrates various stages of another upgrade process in an alternative implementation. As illustrated in stage 700, access system 701 provides access to two versions of a service: service 703 (version n) and service 704 (version n+1). Users may access service 703 using the URL www.service.com, while service 704 may be accessed using the URL www.service-test.com. Note that the URL for service 704 includes a modified domain name relative to the URL for service 703. Examples of service 703 and service 704 include email services, gaming services, unified communication services, collaboration services, social networking services, and any other type of software service.

Both service 703 and service 704 are linked to user content 705. Thus, whether a user approaches user content 705 via service 703 or service 704, in both cases he or she will be able to interact with his or her data in user database 707.

It may be appreciated that service 704 is an upgraded version of service 703. Users are provided with the different paths to the services to allow them to experiment with or otherwise evaluate the service.

Stage 800 in FIG. 8 illustrates what may occur once an individual user decides that she wants to use the upgraded version of the service, service 704, on a moving forward basis. The user may interact with an administrative or settings portal to indicate which version of the service is her preferred version. Assuming the user desires to move forward with service 704 (version n+1), access system 701 can be configured to route requests to www.service.com to service 704 for that user. In other words, access system 701 may be configured to route URLs differently on a per-user basis.

More generally, an example may be considered where two users (user A and user B) subscribe to an online service. A first version of the online service may be accessed using a first URL, while a second version of the service may be accessed using a second URL, which is a modified representation of the first URL.

The users may be notified in a login screen or other user interface to the first version of service that the second version of the service, which is an upgrade, is available. The users may click on or otherwise select the notification to launch an administrative screen. In the administrative screen, the users may be apprised of the URL for the second version of the service. In addition, options may be presented for making the second version of the service their primary version moving forward.

However, before making the second version their primary version, the users may desire to explore the second version of the service. They do this by using the second URL to navigate to the second version of the service. The users' data can be accessed via either version of the service and thus they experience little to no discontinuity between versions.

Eventually a given user may desire to make the new, second version of the service their primary service. Accordingly, the user may make a selection in the administrative portal that effectively changes the association between URLs and services for that user. Moving forward, the first URL will provide that user with access to the second version of the service. Assuming the other user has not yet made such a selection, the first URL will continue to provide the other user with access to the first version of the service.

Such an arrangement may be accomplished by resolving both URLs to the same IP address associated with an access system. Thus, regardless of which URL is used initially by a user (via a suitable application platform) to reach one or the other version of the service, their communications will reach the same access system. The access system can interrogate the application platform and/or application service running on it to determine which URL was used to initiate the communications. Alternatively, the original URL may be included in the communications addressed to the IP address for the access system.

The access system can look-up on a per-user basis which service to route the user to. Identifying the user can be accomplished by presenting the user with a single sign-in page that is presented to any user regardless of which URL they use. In other words, the sign-in page may be the same across versions of the service.

Depending upon the user's identify provided in the login page, combined with the URL used to initially route to the access system, the access system (or some other sub-system associated with it or running behind it) can route the user to the appropriate version of the service. Thus, one user that attempts to access a service with a URL may be routed to one version of the service, while another user attempting to access the service with the same URL may be routed to a different version of the service.

It may be appreciated that the users control which version of the service is their primary version via a settings or administrative menu provided to them in the context of the service. In addition, during the upgrade evaluation phase, both URLs are available to the users so that the users can explore the various features and functionality of the services. Such an arrangement allows a user to effectively control the pace of a service upgrade on an individualized basis. Once a user is satisfied with an upgrade, the user can simply navigate to a settings menu to change the association between URLs and service versions.

It may be appreciated from the foregoing discussion of FIGS. 1-8 that various technical effects may be achieved when implementing enhanced upgrade processes as discussed herein. Allowing tenants or users to control the pace at which an upgrade progresses reduces the down-time normally associated with upgrades and mitigates issues associated with lost productivity. In addition, resources that would otherwise be consumed by having to stand-up and tear down instances of upgraded software services can be mitigated or avoided by transitioning tenants gracefully, at their own pace, from initial deployments to upgraded deployments of a software service.

Referring back to FIG. 1, application platforms 101, 111, and 131 are each representative of any physical or virtual computing system, device, or collection thereof capable of running service applications 103, 113, and 133 respectively. Examples include, but are not limited to, smart phones, laptop computers, tablet computers, desktop computers, hybrid computers, gaming machines, televisions, entertainment devices, and virtual machines, as well as any variation or combination thereof, of which computing system 901 illustrated in FIG. 9 is representative.

Service applications 103, 113, and 133 are each representative of any software application, module, component, or collection thereof capable of implementing user interfaces 105, 115, and 135 to software service 123. Examples include, but are not limited to, web browsers, email applications, real-time communication applications, blogging and micro-blogging applications, social networking applications, e-commerce applications, anti-virus applications, and gaming applications, as well as any other type of application capable of rendering a user interface. Service applications 103, 113, and 133 may be browser-based applications that execute in the context of a browser application. In some implementations, service applications 103, 113, and 133 may execute in the context of or in association with a web page or web site, Service applications 103, 113, and 133 may each be a locally installed and executed application, a streamed application, a mobile application, or any combination or variation thereof. Service applications 103, 113, and 133 may each be implemented as a stand-alone application or may be distributed across multiple applications.

Service platform 121 is representative of any physical or virtual computing system, device, or collection thereof capable of hosting all or a portion of software service 123 and implementing all or portions of upgrade process 200. Examples of service platform 121 include, but are not limited to, server computers, web servers, application servers, rack servers, blade servers, virtual machine servers, or tower servers, as well as any other type of computing system, of which computing system 901 illustrated in FIG. 9 is representative. In some scenarios, service platform 121 may be implemented in a data center, a virtual data center, or some other suitable facility.

FIG. 9 illustrates computing system 901 that is representative of any system or collection of systems in which the various operational architectures, stages, scenarios, and processes disclosed herein may be implemented. Examples of computing system 901 include, but are not limited to, smart phones, laptop computers, tablet computers, desktop computers, hybrid computers, gaming machines, virtual machines, smart televisions, smart watches and other wearable devices, as well as any variation or combination thereof. Other examples include server computers, rack servers, web servers, cloud computing platforms, and data center equipment, as well as any other type of physical or virtual server machine, and any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes at least upgrade process 906, which is representative of upgrade process 200 discussed with respect to the foregoing implementations. When executed by processing system 902 to enhance how software services are upgraded, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions, Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing upgrade process 200 and its associated functionality.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software, in addition to or that include upgrade process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced upgrading for software services. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Referring again to FIG. 3 as an example, through the operation of a computing system or systems of which computing system 901 is representative, transformations may be performed with respect to a deployment of a software service. As an example, an initial deployment 321 may be identified for upgrading. Upon employing upgrade process 200, upgraded deployment 322 is launched and service components 325, 327, and 329 loaded and upgraded therein. In addition, alpha.service.com, while initially resolved to initial deployment 321, is changed to resolve to upgraded deployment 322.

It may be understood that computing system 901 is generally intended to represent a computing system or systems on which software 905 may be deployed and executed in order to implement enhanced service upgrades. However, computing system 901 may also be suitable as any computing system on which software 905 may be staged and from where one or both may be distributed, transported, downloaded, or otherwise provided to yet another computing system for deployment and execution, or yet additional distribution.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface. For example, user interface 105, user interface 115, or user interface 135 may be presented through user interface system 909. In addition, user input made with respect to the user interfaces can be input via user interface system 909.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and MAX (Asynchronous JavaScript and XML), as well as any other suitable protocol, variation, or combination thereof.

While FIGS. 1-8 generally depict relatively few operational scenarios and sequences, it may be appreciated that the concepts disclosed herein may be applied at scale and routinely and for multiple tenants. For example, the update services disclosed herein could be deployed in support of any number of software service deployments.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art wilt understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method for dynamically pacing upgrades to software service deployments, the method comprising:
   in a user interface to an administrative portal for administering an initial deployment of a software service, surfacing a notification that an upgrade is available for the initial deployment;
   in response to a selection of the notification in the user interface, presenting upgrade controls in the user interface for controlling a pace of the upgrade with respect to service components of the initial deployment;
   applying the upgrade incrementally to the service components based least in part on the pace of the upgrade specified via the upgrade controls;
   during a first stage of the upgrade during which only a subset of the service components have been loaded in an upgraded deployment of the software service:
      providing service applications with access to the initial deployment using a service identifier while also providing the service applications with access to an upgraded deployment using an interim service identifier;
      linking a content database to both the initial deployment and the upgraded deployment to provide access to content in the content database; and
   during a subsequent stage of the upgrade, decommissioning the interim service identifier, de-linking the content database from the initial deployment, and providing the service applications with access to the upgraded deployment using the service identifier.

2. The method of claim 1 further comprising launching the upgraded deployment of the software service, wherein applying the upgrade incrementally to the service components based at least in part on the pace of the upgrade specified via the upgrade controls comprises:
   when specified by the pace of the upgrade for each service component of the service components, loading the service component in the upgraded deployment and applying the upgrade to the service component.

3. The method of claim 2 wherein the service identifier resolves to the initial deployment such that the service applications may communicate with the initial deployment using the service identifier, and wherein the interim service identifier differs from the service identifier and resolves to the upgraded deployment such that at least a portion of the service applications may communicate with the upgraded deployment using the interim service identifier.

4. The method of claim 3 further comprising, upon completing the upgrade, changing the service identifier to resolve to the upgraded deployment rather than the initial deployment such that the service applications may communicate with the upgraded deployment using the service identifier.

5. The method of claim 4 wherein the service identifier comprises a uniform resource locator that initially resolves to an Internet protocol address associated with the initial deployment and wherein the interim service identifier comprises a second uniform resource locator that resolves to a second Internet protocol address associated with the upgraded deployment.

6. The method of claim 5 wherein the software service comprises a multi-tenant environment having multiple tenants associated with multiple deployments of the software service, wherein the initial deployment and the upgrade deployment are associated with a specific tenant of the multiple tenants, wherein the uniform resource locator includes a name of the software service and a name of the specific tenant, and wherein the second uniform resource locator includes the name of the software service, the name of the specific tenant, and a string expressive of an interim status of the interim service identifier.

7. The method of claim 1 wherein the software service comprises an online collaboration service and wherein the service components comprise collaboration sites hosted by the initial deployment of the software service and, after applying the upgrade, by an upgraded deployment of the software service.

8. A method for dynamically pacing upgrades to software service deployments in multi-tenant environments, the method comprising:
   identifying a pace specified by a tenant at which to proceed with an upgrade to an initial deployment of the software service associated with the tenant, wherein the initial deployment of the software service comprises a plurality of service components and is associated with a service identifier used by service applications to access the initial deployment of the software service, wherein the specified pace is specified via upgrade controls including at least an option for specifying which service components to proceed with applying the upgrade to first; launching an upgraded deployment:
   while the upgrade progresses incrementally in accordance with the pace:
      linking a content database to both the initial deployment and the upgraded deployment to provide access to content in the content database; and
      resolving the service identifier to the initial deployment of the software service such that the service applications may access the initial deployment of the software service using the service identifier; and
      resolving an interim service identifier that differs from the service identifier to the upgraded deployment of the software service such that the service applications may access the upgraded deployment of the software service using the interim service identifier; and
   upon completing the upgrade:
      decommissioning the interim service identifier;
      de-linking the content database from the initial deployment; and resolving the service identifier to the upgraded deployment of the software service such that the service applications may access the upgraded deployment of the software service using the service identifier.

9. The method of claim 8 further comprising:

in a user interface to an administrative portal associated with the tenant, surfacing a notification that the upgrade is available for the initial deployment;

receiving via a user input to the administrative portal associated with the tenant, user input specifying the pace; and applying the upgrade incrementally to the service components based least in part on the pace of the upgrade specified by the tenant.

10. The method of claim 9 wherein applying the upgrade incrementally to the service components based least in part on the pace comprises:

when specified by the pace of the upgrade for each service component of the service components, loading the service component in the upgraded deployment and applying the upgrade to the service component.

11. The method of claim 8 wherein the service identifier comprises a uniform resource locator that initially resolves to an Internet protocol address associated with the initial deployment and wherein the interim service identifier comprises a second uniform resource locator that resolves to a second Internet protocol address associated with the upgraded deployment.

12. The method of claim 11 wherein the software service comprises a multi-tenant environment having multiple tenants corresponding to multiple deployments of the software service, wherein the initial deployment and the upgrade deployment are associated with a specific tenant of the multiple tenants, wherein the uniform resource locator includes a name of the software service and a name of the tenant, and wherein the second uniform resource locator includes the name of the software service, the name of the tenant, and a string expressive of an interim status of the interim service identifier.

13. The method of claim 8 wherein the software service comprises an online collaboration service and wherein the service components comprise collaboration sites hosted by the initial deployment of the software service and, after applying the upgrade, by the upgraded deployment of the software service.

* * * * *